William A. Sharpe.
Caliper.

108640  PATENTED OCT 25 1870

Witnesses:
A. Jones
J. Rice

Inventor
Wm. A. Sharpe
per J.J. Greenough, Atty

United States Patent Office.

WILLIAM A. SHARPE, OF SYRACUSE, NEW YORK.

Letters Patent No. 108,640, dated October 25, 1870.

---

IMPROVEMENT IN CALIPERS.

---

The Schedule referred to in these Letters Patent and making part of the same.

---

Be it known that I, WILLIAM A. SHARPE, of Syracuse, in the county of Onondaga and State of New York, have invented a new and improved Caliper, which I denominate the Universal Caliper; and I do herein declare and ascertain my said invention, referring to the accompanying drawings, in which—

Figure 1:
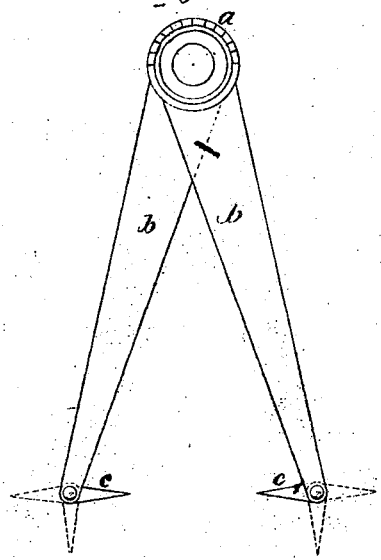

Figure 1 shows the caliper ready for use.

Figure 2:
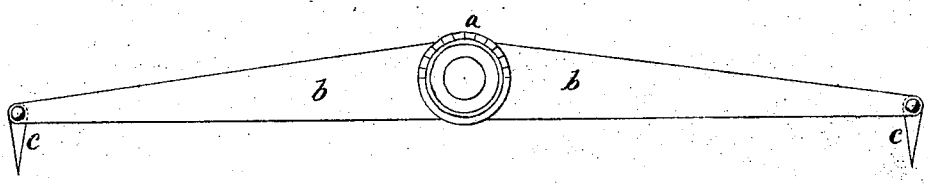

Figure 2 the same opened as a bar-compass.

Calipers as heretofore made can be used only for the one purpose of measuring an outside or an inside surface, and, from their construction, are incapable of measuring both at the same end; nor can they be used for any other purpose, while my new calipers can be applied to various uses with equal facility, as will hereafter appear, serving the purpose of every description of caliper, for compasses, and for scribing and for measuring angles.

The construction is as follows:

Two legs, $b$, are formed like ordinary calipers; as in ordinary calipers or compasses, as clearly seen in the drawings; they are are jointed together at $a$, the joint which I prefer being a rivet and caps.

At the opposite end of each of the legs $b$ I joint a foot-piece, $c$, consisting of a short pointed piece of hardened steel or other suitable substance.

In the drawings, fig. 1, these points are turned inward, making the instrument a caliper for measuring external surfaces; the red lines show the points reversed for internal measurement, the dotted lines show the position for compasses; the proper positions for the other uses will readily be understood and applied by the competent mechanic.

To use the calipers as bar-compasses, the legs must be stretched out as shown in fig. 2.

The instrument thus constructed is intended for the following purposes:

Move the points in toward each other, as in fig. 1, and it is a caliper for outside surfaces or screw-threads; in this case it is important to have the feet $c$ point exactly in the same line toward each other, to effect which the legs $b$ are a little twisted; move one point or foot into line with the leg, as indicated by the blue lines, fig. 1, and it becomes a center caliper, either inside or outside; move the points both outward, and it is an inside caliper, as indicated by the red lines, fig. 1; turn one point in and the other out, and it is a parallel caliper, with one point folded in onto the leg, and the other out in line with the leg, and it is a scribe-gauge; turn both points out into line with the legs, and the instruments are ordinary compasses; open the two legs out into a straight line, and turn the feet $c$ down at right angles, and it forms bar-compasses.

The head $a$ can be marked as an index for opening the legs to indicate any degree of angle for a thread-chisel or other gauge. I prefer jointing the feet $c$ to the legs $b$ with a rivet, the holes slightly countersunk and the ends of the rivets somewhat full or oval, so as to contain material for tightening as it becomes loose by wear.

It will be noticed from the above description that I have, in a simply-constructed caliper, an instrument of very varied application, by jointing the lower ends of the legs, as described, at a cost about the same as either one of them alone.

Having thus fully described my universal calipers,

What I claim is—

Calipers with movable points, constructed and formed substantially in the manner as shown and described.

W. A. SHARPE.

Witnesses:
 J. J. GREENOUGH,
 M. G. HUBBARD.